United States Patent [19]

Baade et al.

[11] Patent Number: 5,543,479
[45] Date of Patent: Aug. 6, 1996

[54] PROCESS FOR THE PRODUCTION OF POLYISOOLEFINS

[75] Inventors: Wolfgang Baade, Odenthal; Roland Heinrich, Leverkusen; Gerhard Langstein, Kürten; Thomas Mulder, Köln, all of Germany; Judit Puskas, Ontario, Canada

[73] Assignee: Bayer AG, Leverkusen, Germany

[21] Appl. No.: 508,237

[22] Filed: Jul. 27, 1995

[30] Foreign Application Priority Data

Aug. 8, 1994 [DE] Germany .................. 44 28 024.6

[51] Int. Cl.$^6$ .............................. C08F 4/14; C08F 4/16; C08F 10/10
[52] U.S. Cl. ........................ 526/88; 526/74; 526/89; 526/135; 526/138; 526/185; 526/189; 526/221; 526/237; 526/339; 526/348.7; 526/941
[58] Field of Search ................. 526/89, 237, 135, 526/348.7, 74, 221, 941, 88, 138, 185, 189, 339

[56] References Cited

U.S. PATENT DOCUMENTS

| | | | |
|---|---|---|---|
| 2,456,354 | 12/1948 | Young | 260/92.6 |
| 3,522,228 | 7/1970 | Fukui et al. | 526/237 X |
| 5,376,744 | 12/1994 | Kennedy et al. | 526/348.7 X |

FOREIGN PATENT DOCUMENTS

| | | |
|---|---|---|
| 0025530 | 3/1981 | European Pat. Off. . |
| 818695 | 7/1949 | Germany . |
| 1030029 | 5/1958 | Germany . |
| 589393 | 6/1947 | United Kingdom . |
| 699770 | 11/1953 | United Kingdom . |

OTHER PUBLICATIONS

Orbit Abstract of EP 0 025 530 (Mar. 25, 1981).

*Primary Examiner*—Fred Teskin
*Attorney, Agent, or Firm*—Connolly & Hutz

[57] ABSTRACT

Polyisoolefins are produced according to the invention by polymerizing isoolefins having 4 to 16 carbon atoms, optionally with conjugated diolefins having 4 to 6 carbon atoms and/or cationically polymerizable, mono- or polyunsaturated, organic compounds having 4 to 16 carbon atoms in the presence of mixtures of carbon dioxide and linear, branched and/or cyclic $C_4$–$C_8$ alkanes and in the presence of catalysts at temperatures of $-70°$ C. to $+20°$ C. and pressures of 1 to 70 bar, wherein the weight ratio of carbon dioxide to alkanes is 10:90 to 90:10.

The process according to the invention largely prevents the formation of fouling on the reactor walls, so ensuring better removal of heat. Moreover, in accordance with the process according to the invention, the polyisoolefins obtained may be directly chemically modified once the carbon dioxide has been removed.

5 Claims, No Drawings

PROCESS FOR THE PRODUCTION OF POLYISOOLEFINS

The present invention relates to a process for the production of polyisoolefins, in particular of butyl rubber, by copolymerisation of isoolefins having 4 to 16 carbon atoms and conjugated diolefins having 4 to 6 carbon atoms and/or cationically polymerisable, mono- or polyunsaturated, organic compounds having 4 to 16 carbon atoms.

The copolymerisation of isobutene with conjugated dienes to yield butyl rubber using the slurry process is known from Ullmanns Encyclopedia of Industrial Chemistry, volume A 23, 1993. Chlorinatedhydrocarbons are used as the solvent in this process. A disadvantage of the slurry process when performed on an industrial scale is the occurrence of fouling on the reactor walls which have a disadvantageous effect on the removal of heat of polymerisation. If a halogenated butyl rubber is, for example, to be produced using the slurry process, it is disadvantageous that the butyl rubber cannot be halogenated directly in the methyl chloride slurry, but only after the already worked up rubber has been dissolved in hexane in an additional stage or after the methyl chloride slurry has likewise been dissolved in hexane.

It is also known to produce isobutene copolymers using the solution process in isopentane. Processes of this type are described, for example, in U.S. Pat. Nos. 2,356,128, 3,361, 725, GB 1,157,043, DE 2 328 541 and U.S. Pat. No. 4,171,414. A disadvantage of this solution process is the relatively low concentration of the polymer in the reaction solution in comparison with the above-stated slurry process. The low polymer concentration is necessary in order to avoid an elevated viscosity of the reaction solution and in order better to be able to remove the liberated heat.

It is also known to polymerise isobutene using Lewis acids the presence of liquid carbon dioxide (R. H. Biddulph and P. H. Plesch, J. Chem. Soc. (1960) 3913). A disadvantage of this process is the restricted temperature range for the use of such slurry processes limited by the physical properties of the carbon dioxide together with the elevated pressures occurring during such processes. When the process is operated continuously, an additional disadvantage is that fouling is formed on the stirrer and reactor walls which are costly to remove. A further disadvantage is that polymerisation products having a comparatively low molecular weight are obtained in this process.

It has now been found that the above-stated disadvantages in the production of polyisoolefins may be avoided if polymerisation is performed in the presence of a mixture of carbon dioxide and linear, branched and/or cyclic $C_4$–$C_8$ alkanes.

The present invention accordingly provides a process for the production of polyisoolefins, which is characterised in that isolefins having 4 to 16 carbon atoms are polymerised optionally with conjugated diolefins having 4 to 6 carbon atoms and/or cationically polymerisable, mono- or polyunsaturated, organic compounds having 4 to 16 carbon atoms in the presence of mixtures of carbon dioxide and linear, branched and/or cyclic $C_4$–$C_8$ alkanes and in the presence of catalysts at temperatures of –70° C. to +20° C. and pressures of 1 to 70 bar, wherein the weight ratio of carbon dioxide to alkanes is 10:90 to 90:10.

In the polymerisation according to the invention, it is very important to thoroughly mix the mixture of carbon dioxide, alkanes and monomers, such that the organic phase dispersed in carbon dioxide has an average particle size of >200 μm, preferably of 200 μm to 1 mm. Isoolefins having 4 to 16 carbon atoms, preferably 4 to 8 carbon atoms, which may be cited by way of example are: isobutene, 2-methyl-1-butene, 3-methyl-1-butene, 4-methyl-1-pentene and β-pinene, preferably isobutene and 2-methyl-1-butene; conjugated diolefins having 4 to 6 carbon atoms are: isoprene, butadiene, 2,3-dimethylbutadiene, cyclopentadiene, methylcyclopentadiene, 1,3-cyclohexadiene, preferably isoprene and cationically polymerisable, mono- or polyunsaturated, organic compounds having 4 to 16 carbon atoms, preferably 4 to 10 carbon atoms, are: styrene, 4-methylstyrene, divinylbenzene, α-methylstyrene, dimethylfulvene, preferably 4-methylstyrene and divinylbenzene.

Linear, branched and/or cyclic $C_4$–$C_8$ alkanes which may be used in the process according to the invention are: pentanes, hexanes, heptanes, octanes, cyclopentane, i., cyclohexane, cyclooctane, methylcyclopentane, 2-methylpentane, 3-methylpentane, preferably hexanes and 2-methylbutane.

The carbon dioxide may be added to the stated alkanes in gaseous, liquid as well as solid form.

Catalysts which may be considered for the process according to the invention are both known Friedel-Crafts catalysts as well as so-called multifunctional initiators (c.f. for example Y. Jiang and J. M. J. Fréchet, Polymer Preprints 26 (1989) 127).

Friedel-Crafts catalysts which may in particular be cited are: $AlCl_3$, $BCl_3$, $BF_3$, $Al(C_2H_5)Cl_2$, $TiCl_4$, $SnCl_4$, preferably $AlCl_3$ and $BCl_3$.

So-called multifunctional initiators which may be cited by way of example are: poly[styrene-co-2-acetoxy-2-(4-vinylphenyl)propane] (A) or poly[styrene-co-2-methoxy-2-(4vinylphenyl)propane] (B) in combination with Lewis acids $BCl_3$ (C) or $TiCl_4$ (D), preferably (A) in combination with (C).

The stated Friedel-Crafts catalysts may be used in quantities of $1 \times 10^{-2}$ to $1 \times 10^{-5}$ mol of initiator per mol of monomer. Preferred quantities are $1 \times 10^{-1}$ to $1 \times 10^{-4}$ mol of initiator per mol of monomer. The stated multifunctional initiators may be used in quantities of 1 mol of initiator per mol of monomer to $1 \times 10^{-6}$ mol of initiator per mol of monomer.

The process according to the invention is preferably performed at temperatures of 0° C. to –70° C. and at pressures of 1 to 40 bar.

In the process according to the invention, a weight ratio of carbon dioxide to the stated alkanes of 3:1 to 1:4 is preferred.

Should the stated isoolefins be copolymerised with the stated conjugated diolefins and/or the cationically polymerisable, mono- or polyunsaturated, organic compounds using the process according to the invention, a weight ratio of isoolefins to diolefins and unsaturated organic compounds of 95:5 to 99.5:0.5 is preferred.

The process according to the invention may be performed both continuously and discontinuously.

In a preferred embodiment, the process according to the invention is performed discontinuously, for example in the following manner:

The reactor, which has been cooled to the reaction temperature, is charged with purified hexane and the monomers. Once the reactor has cooled to or below –60° C., the desired quantity of carbon dioxide is passed over a desiccant and condensed into the reactor. Once the reaction temperature has been established, the catalyst is pumped in or introduced via a lock, wherein the contents of the reactor are vigorously mixed. All operations are performed under protective gas. The course of the reaction is monitored by means of the evolution of heat. On completion of the exothermic reaction, the reaction is terminated with 2,5-di-tert.-butyl-4-methylphenol dissolved in ethanol. As the reactor temperature rises, the carbon dioxide is vented, optionally with the simultaneous addition of warm hexane. The resultant solution in hexane is finished in a customary manner by stripping or is halogenated or modified in an another manner in a subsequent reaction (c.f for example B. Vollmert, Grundriβ der Makromolekularen Chemie [outline of macromolecular chemistry], Karlsruhe, 1979).

In comparison with the known solution and slurry processes, the process according to the invention described above has the following advantages: fewer fouling formed, better removal of heat and direct chemical modification in the alkane solution after removal of the carbon dioxide.

EXAMPLES

EXAMPLE 1

A 3 l Hastelloy reactor equiped with an anchor stirrer was charged with 1048 g of desiccated n-hexane. 200 ml of this were distilled off. The reactor was then cooled to −60° C. 300 g of isobutene were then condensed into the reactor through a submerged coil. The isobutene was here desiccated by being passed through a molecular sieve (BAYLITH T 144). 900 g of carbon dioxide were then condensed into the reactor in the same manner. The reactor temperature was raised to −50° C. and the catalyst added through a lock.

The catalyst solution comprises a mixture of 40 ml of n-hexane, 3.0 mmol of titanium tetrachloride and 6.0 mmol of diethylaluminium chloride which had been stirred for 19 h at 25° C. with the exclusion of light. After 5 h, polymerisation was terminated by adding 5 ml of ethanol (with 1% 2,6-di-t.-butyl-4-methylphenol), the reactor temperature raised, the carbon dioxide vented and the polymer then precipitated with ethanol.

Yield was 101.2 g (33.7%). Mooney viscosity (100° C., 4 min) was 67. The intrinsic viscosity (toluene, 30° C.) was 1.833 dl/g.

EXAMPLE 2

In a similar manner to example 1, 300 g of isobutene and 1800 g of carbon dioxide were condensed into the reactor. The reactor was cooled to −50° C. The reaction was initiated by adding a mixture of 40 ml of n-hexane, 3 mmol of titanium tetrachloride and 6 mmol of diethylaluminium chloride, which had been stirred for 23 h at 25° C. with the exclusion of light.

206.1 g of polymer were isolated. The Mooney value (100° C., 4 min) was 21.5, the intrinsic viscosity (toluene, 30° C.) was determined at 0.69 dl/g.

EXAMPLE 3

A mixture of 707 g of n-hexane and 6.8 g of isoprene were initially introduced, 400 g of isobutene and 900 g of carbon dioxide were condensed into the reactor. Polymerisation was initiated at −50° C. by adding a mixture of 60 ml of n-hexane, 7.5 mmol of t.-butyl chloride and 14 mmol of diethylaluminium chloride. 341.2 g of polymer were isolated (intrinsic viscosity (toluene, 30° C.): 0.433 dl/g).

What is claimed is:

1. Process for the production of polyisoolefins, comprising the following steps:

combining isoolefins having 4 to 16 carbon atoms, and optionally conjugated diolefins having 4 to 6 carbon atoms and/or cationically polymerizable, mono- or polyunsaturated, organic compounds having 4 to 16 carbon atoms, with carbon dioxide, linear, branched and/or cyclic $C_4$–$C_8$ alkanes and catalysts at temperatures of −70° C. to +20° C. and pressures of 1 to 70 bar, to form a reaction mixture wherein the weight ratio of carbon dioxide to alkanes is 10:90 to 90:10;

mixing said reaction mixture to form an organic phase that is dispersed in said carbon dioxide so that the organic phase has an average particle size of <200 μm;

polymerizing said isoolefins having 4 to 16 carbon atoms, optionally with said conjugated diolefins having 4 to 6 carbon atoms and/or said cationically polymerizable, mono- or polyunsaturated, organic compounds having 4 to 16 carbon atoms, at said temperatures and pressures to form said polyisoolefins.

2. Process according to claim 1, wherein the reaction mixture is mixed in such a manner that the organic phase dispersed in carbon dioxide has an average particle size of from 200 μm to 1 mm.

3. Process according to claim 1, wherein the catalysts used are Friedel-Crafts catalysts.

4. Process according to claim 1, wherein the catalysts used are $AlCl_3$, $TiCl_4$, $SnCl_4$, $BCl_3$ and/or $(C_2H_5)AlCl_2$.

5. Process according to claim 1, wherein the catalysts are used in quantities of 1 mol per mol of monomer to $1 \times 10^{-6}$ mol per mol of monomer.

\* \* \* \* \*

UNITED STATES PATENT AND TRADEMARK OFFICE
CERTIFICATE OF CORRECTION

PATENT NO. : 5,543,479
DATED : August 6, 1996
INVENTOR(S) : Baade, et al

It is certified that error appears in the above-indentified patent and that said Letters Patent is hereby corrected as shown below:

In Column 4, line 29, "$<200\mu m;$" should be --$>200\mu m;$--.

Signed and Sealed this

First Day of April, 1997

Attest:

BRUCE LEHMAN

Attesting Officer

Commissioner of Patents and Trademarks